(No Model.)
G. C. BURRELL & E. H. ROBLEE.
DRINKING FOUNTAIN FOR POULTRY.
No. 443,428. Patented Dec. 23, 1890.
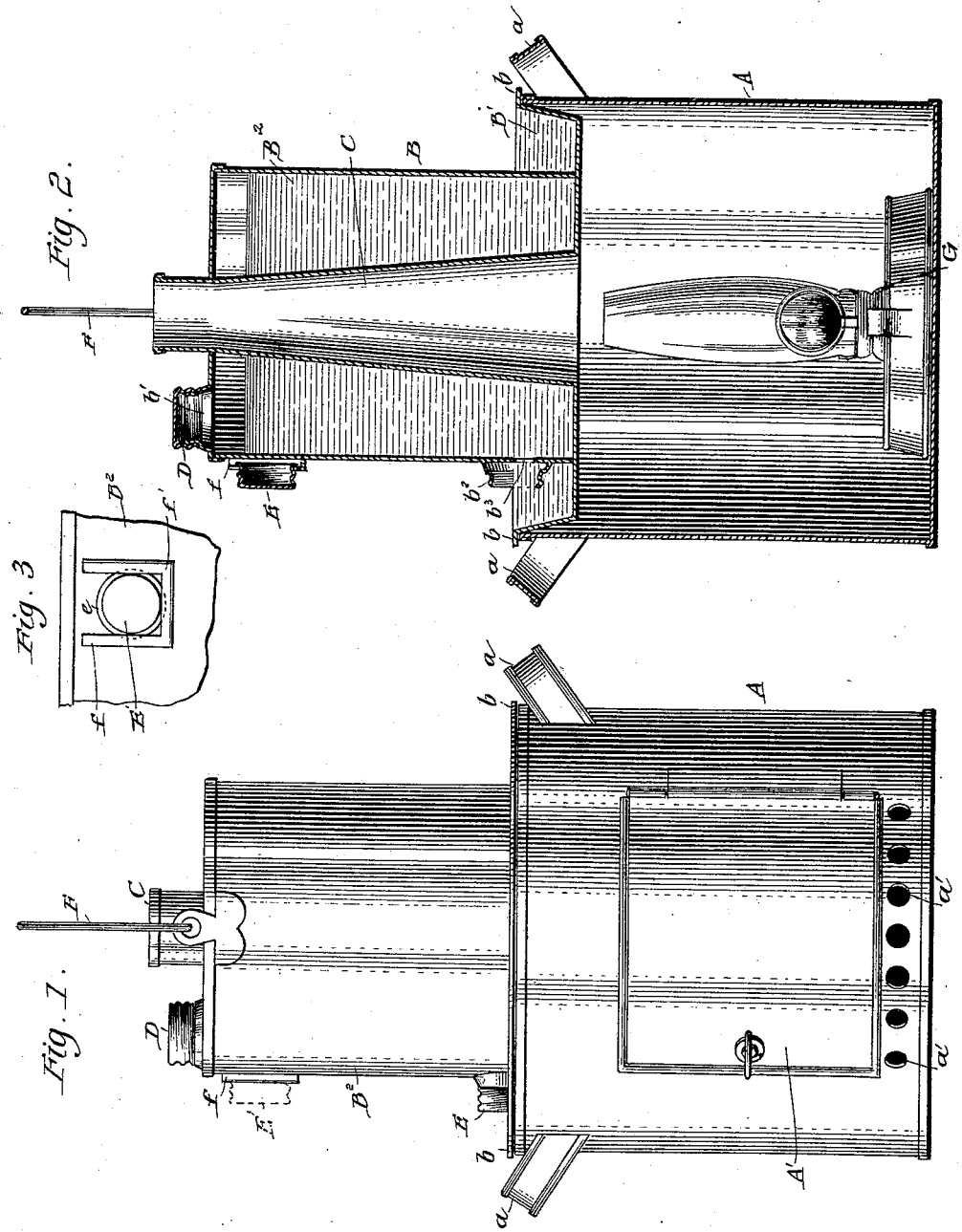
WITNESSES:
INVENTOR:
ATTORNEYS

UNITED STATES PATENT OFFICE.

GLENN C. BURRELL AND EDWIN H. ROBLEE, OF CANISTEO, NEW YORK.

DRINKING-FOUNTAIN FOR POULTRY.

SPECIFICATION forming part of Letters Patent No. 443,428, dated December 23, 1890.

Application filed July 18, 1890. Serial No. 359,118. (No model.)

*To all whom it may concern:*

Be it known that we, GLENN C. BURRELL and EDWIN H. ROBLEE, both of Canisteo, in the county of Steuben and State of New York, have invented a new and Improved Drinking-Fountain for Poultry, of which the following is a full, clear, and exact description.

Our invention relates to improvements in drinking-fountains for poultry; and the object of our invention is to produce a fountain that will keep the water in a clean and wholesome condition and that will supply it in sufficient quantities for the poultry, and also to provide means for heating the water in the fountain when desired.

The invention will be hereinafter fully described, and then pointed out in the claim.

Reference is to be had to the accompanying drawings, forming a part of this specification, in which similar letters of reference indicate corresponding parts in all the figures.

Figure 1 is a front elevation of the device embodying our invention. Fig. 2 is a vertical transverse section of the same, and Fig. 3 is a broken detailed view showing the slide which carries one of the caps of the fountain when the cap is not in use.

The receptacle A, which is made preferably of sheet metal, is open at the top, is provided in front with a suitable door A', with handles $a$, by which it may be conveniently moved, and with perforations $a'$ beneath the door, through which air is admitted to ventilate the receptacle and supply the heater within with the necessary oxygen. The fountain B comprises a shallow pan B' and a reservoir $B^2$ mounted vertically within the pan and fixed thereto. The pan B' fits closely within the receptacle A, and has around its upper edge a lateral flange or rim $b$, which rests upon the upper edge of the receptacle A, and this supports the fountain position.

The reservoir $B^2$ has a suitable inlet-nozzle $b'$ at the top, through which it is filled, and which is usually kept closed by a screw-cap D, and near the bottom of the reservoir $B^2$, and on one side is a similar nozzle $b^2$, which is also provided with a screw-cap E. A perforation $b^3$ extends through the side of the reservoir $B^2$ and into the nozzle $b^2$, the top of the perforation being a little below the rim $b$ of the pan. A tapering flue or chimney C extends centrally through the reservoir $B^2$, said chimney being widest at the bottom and projecting slightly above the top of the reservoir. The reservoir is also provided with a bail F, by means of which the fountain may be raised from the receptacle A, when desired.

A lamp G, having a large flat bottom portion, is placed within the receptacle A when the water in the reservoir $B^2$ is to be heated, although an oil-stove or any other suitable heater may be used in place of the lamp. The lamp has a tin chimney with a mica-covered opening, through which the blaze may be seen, and which has a tendency to throw more heat upward than a glass chimney and is not so easily broken.

On the front portion of the reservoir B is a slide formed of the vertical angle-strips $f$ and the cross-strip $f'$ at the bottom, said strips being adapted to hold between them the cap E, said cap having a projecting flange $e$, which fits between the strips and the side of the reservoir. The height of the receptacle A should be such as to bring the pan B' when placed upon the receptacle within easy reach of an ordinary-sized fowl.

When the reservoir $B^2$ is to be filled, the cap E is screwed tightly upon the nozzle $b^2$, the cap D removed from the nozzle $b'$, and the water is poured through the said nozzle. The cap D is then screwed back into place upon the nozzle $b'$, the pan B' is placed in the top of the receptacle A with the rim $b$ resting upon the upper edge of the receptacle, and the cap E is removed from the nozzle $b^2$ and placed in the slide on the reservoir $B^2$, as shown in Fig. 3 and as indicated by dotted lines in Fig. 1. When the cap E is removed, the water will flow through the perforation $b^3$ and nozzle $b^2$ into the pan B' until the pan is about full, and when the water flows into the pan, as described, a vacuum will be created in the upper portion of the reservoir $B^2$, which prevents all the water from flowing out through the perforation $b^3$, and only sufficient water will flow through to keep the pan full. The water will thus be kept in a clean condition, and as fast as it is drunk by the poultry or evaporates it will be replenished by the fountain.

In warm weather it is desirable that the fountain be used without the heater; but in cold weather the lamp G is inserted in the receptacle and lighted, and by regulating the flame of the lamp the water in the fountain may be kept at any desired temperature. The heat from the lamp passes through the chimney C, thereby quickly heating the water, and the surplus heat passing through the chimney has a tendency to warm the poultry-house.

By using the device above described and keeping the water warm in winter the house is kept sufficiently warm to prevent the poultry from freezing their combs, and they will also lay much better than when provided with cold drink.

Having thus fully described our invention, we claim as new and desire to secure by Letters Patent—

A drinking-fountain comprising the heater-receptacle and the reservoir having an external trough, the reservoir proper and its trough being both fitted in the heater-receptacle, whereby the water supplied is heated while in both the reservoir and trough, all substantially as and for the purposes set forth.

GLENN C. BURRELL.
EDWIN H. ROBLEE.

Witnesses:
WM. BURRELL,
WM. HAMMER.